United States Patent [19]
Potter

[11] 4,382,191
[45] May 3, 1983

[54] WIND POWERED ELECTRICITY GENERATION SYSTEM

[76] Inventor: Shirley L. Potter, 2400 Alpine Blvd., Alpine, Calif. 92001

[21] Appl. No.: 267,803

[22] Filed: May 28, 1981

[51] Int. Cl.³ .................................................. F03D 3/00
[52] U.S. Cl. ........................................ 290/55; 290/44; 416/197 A
[58] Field of Search ...................... 290/44, 55; 416/197

[56] References Cited

U.S. PATENT DOCUMENTS

| | | | |
|---|---|---|---|
| 322,862 | 7/1885 | Starr | 416/197 A |
| 1,212,109 | 1/1917 | Rodwick | 290/55 X |
| 1,292,225 | 1/1919 | Araiza | 416/197 A |
| 1,359,693 | 11/1920 | Gill | 416/197 A |
| 3,565,546 | 2/1971 | Shanahan | 416/197 A |

FOREIGN PATENT DOCUMENTS 19401 of 1891 United Kingdom ........... 416/197 A

*Primary Examiner*—J. V. Truhe
*Assistant Examiner*—W. E. Duncanson, Jr.
*Attorney, Agent, or Firm*—Charles C. Logan, II

[57] ABSTRACT

A wind powered electricity generation system having at least one wind vane assembly, an elongated shaft attached substantially perpendicularly to the bottom of the wind vane assembly, a tower supporting the shaft, and drive gears mounted on the shaft that are connected to an electricity generator. Each of the wind vane assemblies has a carrier member having a plurality of support arms extending outwardly from the carrier member in a horizontal plane. A plurality of elongated trough-shaped vanes are attached by fastener means to a point adjacent the ends of the support arms. The front side of the trough-shaped vanes point outwardly substantially perpendicularly from the lateral attaching surface of the support arms. Each of the trough-shaped vanes have a longitudinally extending axis that makes an angle between 30 degrees and 60 degrees with a vertical axis that pases through the point of attachment of the back of the trough-shaped vane and the support arm.

3 Claims, 4 Drawing Figures

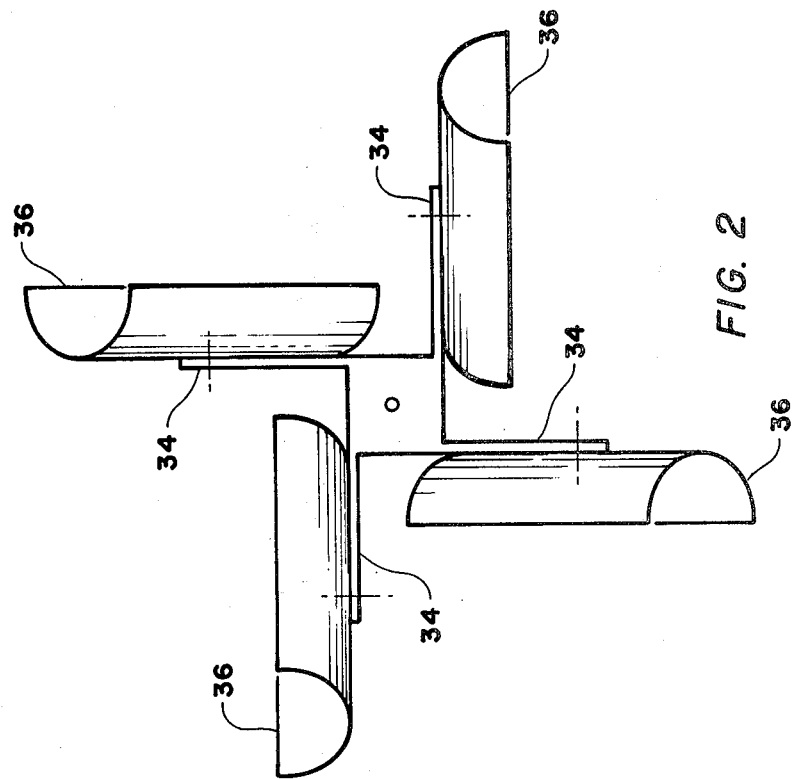
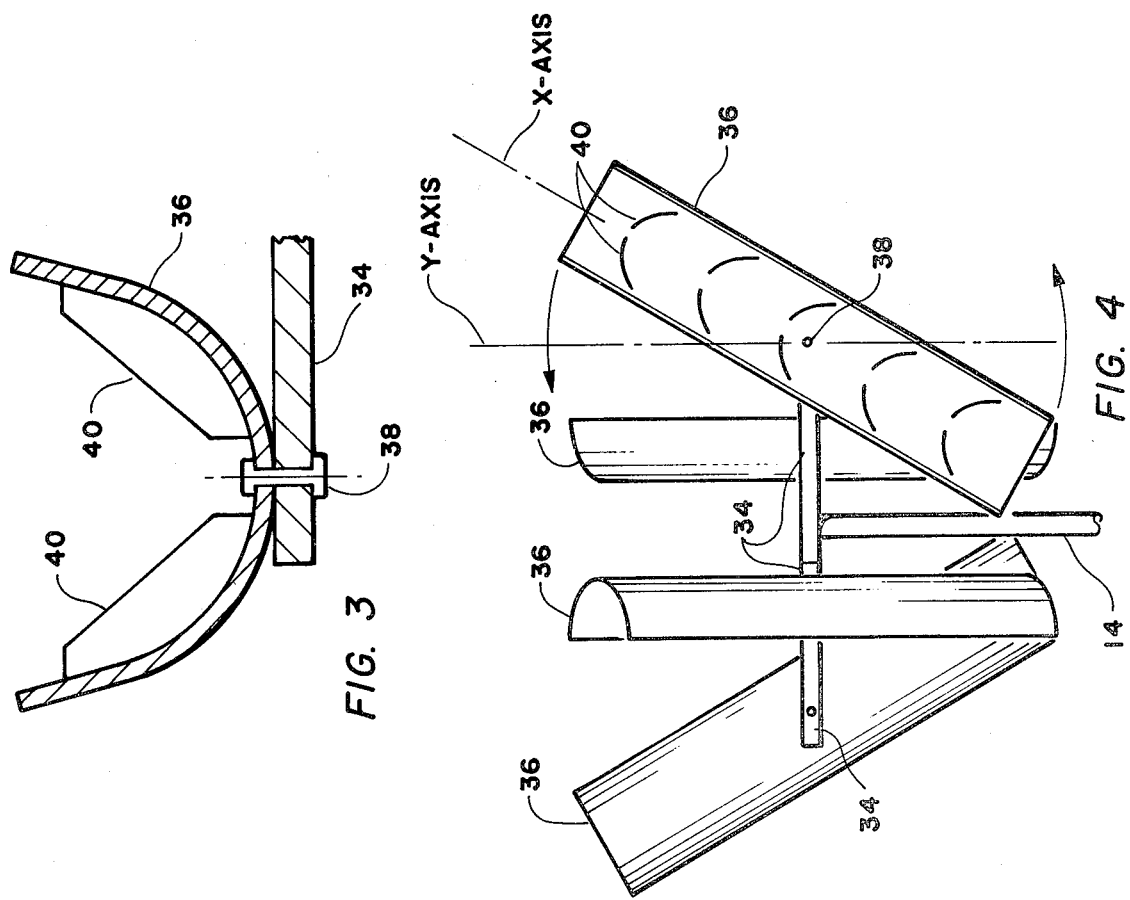

WIND POWERED ELECTRICITY GENERATION SYSTEM

BACKGROUND OF THE INVENTION

The invention relates to a wind powered electricity generation system and more particularly to a novel wind vane assembly. In the past wind vane assemblies have been primarily configured like those of a conventional wind mill. More recent advances in technology have seen some of the newer wind vane assemblies having vanes configured like propeller blades.

It is an object of the invention to provide a novel wind vane assembly that is economical to manufacture and assemble.

It is also an object of the invention to provide a novel wind vane assembly that can be marketed at a reasonable price.

It is another object of the invention to provide a novel wind vane assembly that has uniquely configured vanes that respond to the slightest breeze.

SUMMARY OF THE INVENTION

The novel wind powered electricity generation system has at least one wind vane assembly, an elongated shaft attached substantially perpendicularly to the bottom of the wind vane assembly, a tower supporting the shaft, and drive gears mounted on the shaft connected to an electricity generator.

The unique wind vane assembly has a carrier member and a plurality of support arms extend outwardly from the carrier member. An elongated trough-shaped vane is attached to a point adjacent the end of each of the support arms. The front side of the trough-shaped vanes point outwardly substantially perpendicularly from the lateral attaching surface of the support arms. Each of the trough-shaped vanes have a longitudinally extending axis that can be adjusted to make an angle between 30 degrees and 60 degrees with a vertical axis that passes through the point of attachment on the back of the trough-shaped vane and the support arm. The carrier member is centrally positioned in the wind vane assembly and the support arms lie in a horizontal plane. The trough-shaped vanes have a semicircular lateral cross section.

In the preferred embodiment, there are four trough-like vanes and likewise four support arms. These trough-like vanes are positioned with their open side to the wind and are secured to the support arms at approximately a 45 degree angle. The supporting arms are oriented at right angles to each other.

Other wind vane assemblies may be designed utilizing fewer than four trough-like vanes or more than four trough-like vanes. The novel wind vane assembly has a flywheel effect as most of its weight is distributed away from the center of the carrier and this effect is enhanced due to centrifical force and momentum once the wind vane assembly is rotating. This allows a more uniform speed of revolving of the wind vane assembly when irregular winds prevail.

The elongated shaft is supported by thrust bearings to carry the load. The vanes, arms, carrier and shaft act as one unit, all revolving together to develop the power produced by the shaft. The number of bearings used on the shaft will depend on the height of the tower.

The electricity produced by the generator that is driven by the gears on the shaft, can be used directly to operate electricity operated equipment or it may be connected to storage batteries so that the electricity may be used at other times.

The wind vanes can be made of sheet metal or aluminum alloys, or any other suitable material. In some embodiments, small cleats may be positioned within the inner face of the wind vanes to retard the action of the wind rushing through the vanes and develop more push power. In operation, a vacuum is created by the motion of the wind vanes and it assists in eliminating some of the drag on the back side of the wind vanes as they rotate.

Additional wind vane assemblies may be mounted on the same shaft at lower positions along the shaft. The angles at which the supporting arms radiate outwardly must be staggered from the orientation of the other wind vane assembly to avoid any turbulence that might be created from the vanes below, as these vanes respond to the wind velocity, and also to get the maximum power from the wind. The use of multiple wind vane assemblies will add significantly to the power that may be delivered from the base of the shaft which is used to operate the electricity generator or other optional equipment.

DESCRIPTION OF THE DRAWINGS

FIG. 2 is a top plan view of the novel wind vane assembly;

FIG. 3 is a lateral cross sectional view taken through one of the elongated trough-shaped vanes; and FIG. 4 is a side elevation view of the novel wind vane assembly.

DESCRIPTION OF THE PREFERRED EMBODIMENT

Figure 1:
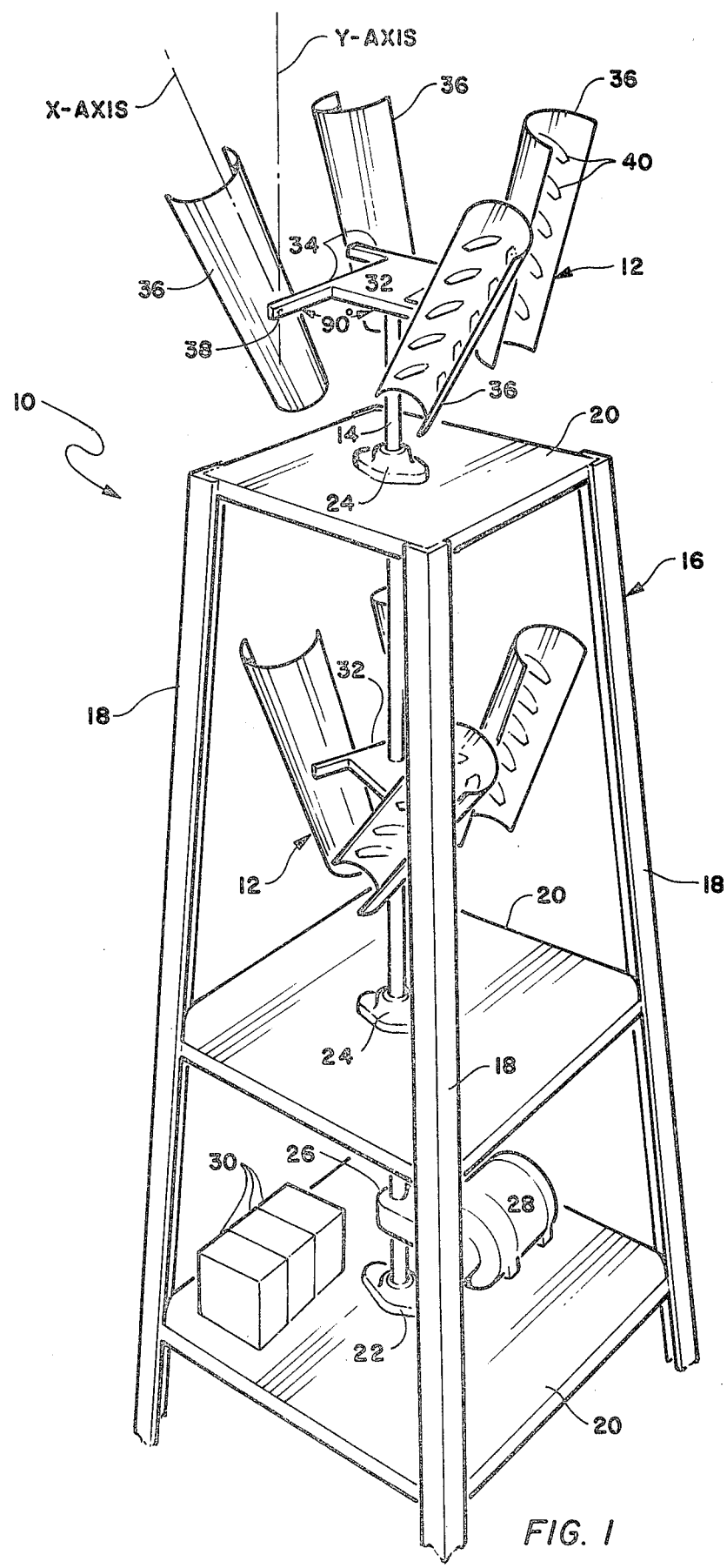
FIG. 1 is a perspective view of the novel wind powered electricity generation system.

Applicant's novel wind powered electricity generating system is generally designated numeral 10. It has one or more wind vane assemblies 12. These wind vane assemblies 12 are mounted on an elongated shaft 14. A tower 16 supports the shaft.

The tower 16 is formed from a plurality of upright legs 18 that are laterally structurally tied to each other by platforms 20. The bottom of shaft 14 is mounted in a thrust bearing 22, and additional support for the shaft is provided by pillow block bearings 24 mounted on each of the respective platforms 20. The bottom of the shaft has a drive gear 26 mounted thereon that drives the electricity generator 28. The electricity may be used at that time or it may be stored in batteries 30 located on the bottom platform 20.

Each of the novel wind vane assemblies 12 has a carrier member 32 from which extends outwardly a plurality of support arms 34. Attached to these support arms are a plurality of elongated trough-shaped vanes 36. Fastners 38 attach the back of vanes 36 to a point adjacent the end of support arms 34.

Each of the trough-shaped vanes 36 have a longitudinally extending x-axis that makes an angle between 30 degrees and 60 degrees with a vertical y-axis that passes through the point of attachment of the back of the trough-shaped vane 36 and the support arm 34. In FIG. 3 the lateral cross section of the trough-shaped vane 36 is seen to be semicircular. A plurality of upstanding cleats 40 may be attached to the inner surface of the trough-shaped vanes 36 and these cleats are oriented in pairs that form the shape of an open bottom v-configuration.

What is claimed is:

1. A wind powered electricity generation system comprising:
    at least one wind vane assembly, said wind vane assembly having a carrier member, a plurality of elongated trough-shaped vanes, a plurality of support arms, fastner means attaching the back of said vanes to a point adjacent the ends of said support arms, the front end of said trough-shaped vanes pointing outwardly substantially perpendicularly from the lateral attaching surface of said support arms, each of said trough-shaped vanes having a longitudinally extending axis that makes an angle between 30 degrees and 60 degrees with a vertical axis that passes through the point of attachment of the back of the trough-shaped vane and the support arm, upstanding cleats on the surface of said trough-shaped vanes, said cleat being oriented in pairs that form the shape of an open bottom V-configuration;
    an elongated shaft attached substantially perpendicularly to the bottom of said carrier member;
    a tower supporting said shaft; and
    drive gear means mounted on said shaft, said drive gear means being connected to an electricity generator.

2. A wind powered electricity generation system as recited in claim 1 further comprising a second wind vane assembly mounted on said elongated shaft at a position downwardly spaced from the other wind vane assembly.

3. A wind powered electricity generation system comprising:
    at least one wind vane assembly, said wind vane assembly having a carrier member, a plurality of elongated trough-shaped vanes, a plurality of support arms, fastener means attaching the back of said vanes to a point adjacent the ends of said support arms, the front side of said trough shaped-shaped vanes pointing outwardly substantially perpendicularly from the lateral attaching surface of said support arms, each of said trough-shaped vanes having the longitudinally extending axis that makes an angle between 30 degrees and 60 degrees with a vertical axis that passes through the point of attachment of the back of the trough-shaped vane and the support arm, said trough-shaped vanes having a semi-circular lateral cross-section and and being open on both of their opposite ends;
    an elongated shaft attached substantially perpendicularly to the bottom of said carrier member;
    a tower supporting said shaft; and
    drive gear means mounted on said shaft, said drive gear means being connected to an electricity generator.

* * * * *